United States Patent Office 3,689,452
Patented Sept. 5, 1972

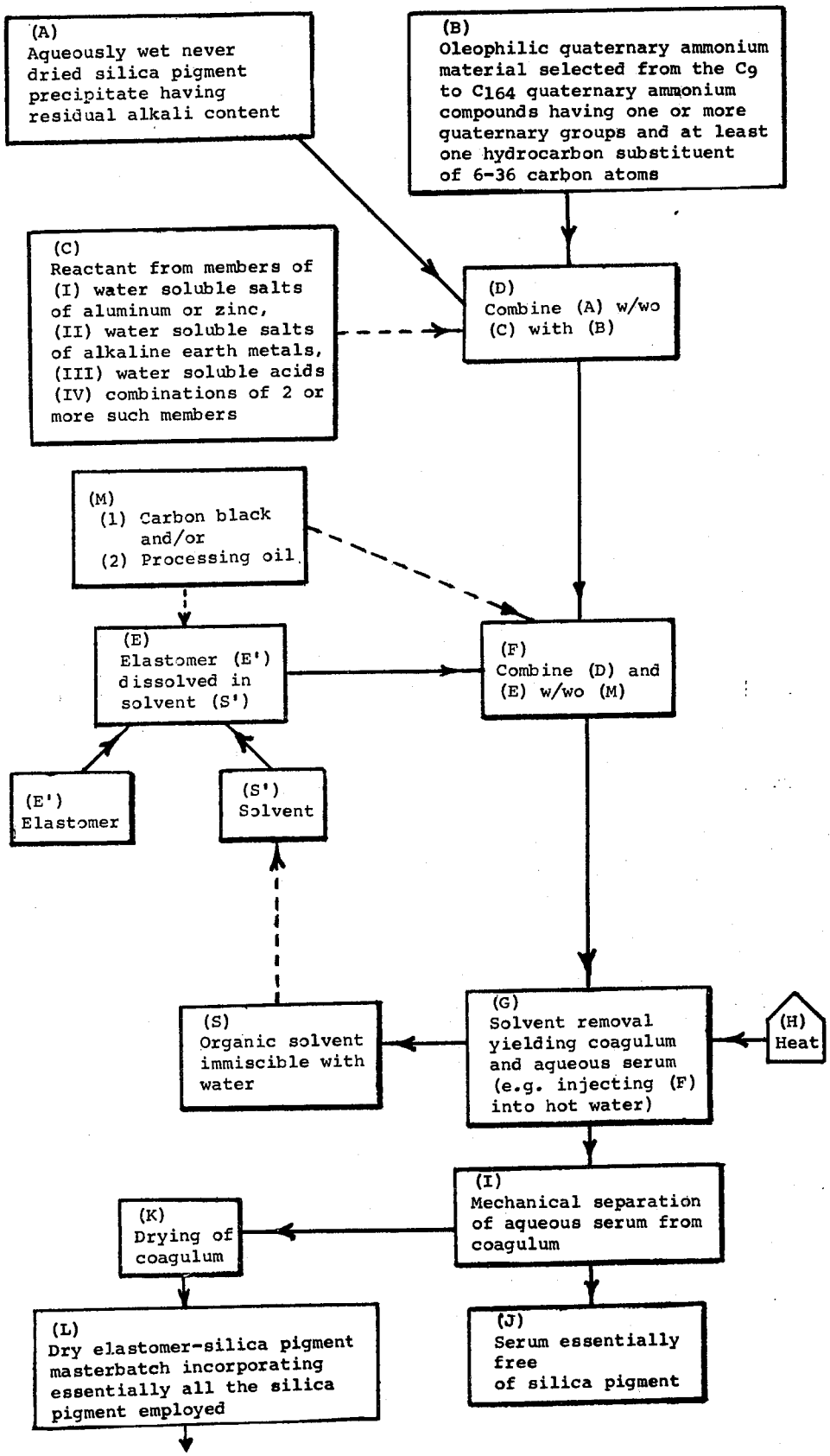

3,689,452
ELASTOMER-SILICA PIGMENT MASTERBATCHES AND PRODUCTION PROCESSES RELATING THERETO
Oliver W. Burke, Jr., Fort Lauderdale, Fla.
(1510 SW. 13th Court, Pompano Beach, Fla. 33061)
Continuation-in-part of application Ser. No. 798,215, Sept. 16, 1968, which is a division of application Ser. No. 611,250, Jan. 24, 1967, now Patent No. 3,523,096, which in turn is a continuation-in-part of applications Ser. No. 458,379 and Ser. No. 458,420, both May 24, 1965, and Ser. No. 479,806, Aug. 16, 1965, now Patent No. 3,401,017. This application July 16, 1970, Ser. No. 55,460
Int. Cl. C08c *11/10;* C08d *9/00*
U.S. Cl. 260—33.6 AO                               6 Claims

ABSTRACT OF THE DISCLOSURE

Curbing of silica pigment losses and the promotion of uniformity of product in the preparation of an elastomer-silica pigment masterbatch are effected (a) by combining (1) an aqueous slurry of hydrated silica pigment precipitate which has a bound alkali content, which has been prepared by precipitation from an aqueous alkali metal silicate solution, and which has been continuously maintained in an aqueous phase without having been dried after its precipitation, with (2) a quantity of oleophilic quaternary ammonium material, (3) combining the resulting treated silica pigment slurry with a solvent dispersion of the elastomer, with or without (4) carbon black and/or processing oil and (5) selected reactant, and (b) removing the solvent and aqueous phase and recovering the resulting combination as a masterbatch essentially without loss of silica pigment.

CROSS REFERENCE TO RELATED APPLICATIONS

This application is a continuation-in-part of copending application Ser. No. 798,215, filed Sept. 16, 1968, now abandoned, as a division of application Ser. No. 611,250, filed Jan. 24, 1967, now U.S. Pat. 3,523,096, said application Ser. No. 611,250 having been a continuation-in-part of earlier applications Ser. No. 458,420, filed May 24, 1965, now abandoned; Ser. No. 458,379, filed May 24, 1965, now abandoned; and Ser. No. 479,806, filed Aug. 16, 1965, now U.S. Pat. 3,401,017, the disclosures of all of which are incorporated herein by reference. Furthermore, this application is directed to a species of invention that was nonelected in applicant's copending application Ser. No. 55,384, filed July 16, 1970, and, pursuant to a restriction requirement, was withdrawn from consideration in that case.

BACKGROUND OF THE INVENTION (1) Field of the invention

The field to which this invention pertains is the preparation of masterbatches from solvent dispersions of elastomers and aqueous slurries of precipitated silica pigments.

BRIEF DESCRIPTION OF THE DRAWING

The single figure of the drawing is a block-diagram illustrative of the process aspect of the invention.

SUMMARY OF THE INVENTION

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses (i.e. the formation of silica gel) and to promote the precipitation of a silica pigment in finely divided form (i.e. in particles in the reinforcing size range of about 0.015 to about 0.150 micron, preferably 0.02 to 0.06 micron) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10% by weight as $Na_2O$, and upon being dried in this state form aggregates, from the pigment particles of reinforcing size, which aggregates are of much greater than reinforcing size and will not adequately disperse (i.e. break down into particles of reinforcing size) when incorporated into rubber either by dry compounding or latex compounding.

When one treats such alkaline wet silica pigments with water soluble salts of alkaline earth metals, e.g. calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus, the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g. avoiding loss of pigment in the serum in wet masterbatching) and adequate dispersion of the pigment in the elastomer in particles of reinforcing size (e.g. minimizing the pigment aggregation problem); and the present invention provides a process for accomplishing these ends by forming the masterbatch from aqueously wet hydrated silica pigment precipitate having a bound alkali content of 0.1 to 10% by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

Thus, the present invention, inter alia, provides a simple and efficient process for the curbing of silica pigment losses and the promotion of uniformity of product in the preparation of masterbatches of measured silica pigment content. The invention comprises treating never dried wet silica pigment with oleophilic quaternary ammonium material and combining the so treated never dried silica pigment with elastomer solution and recovering the masterbatch. As shown in the drawing, the process comprises the steps of:

(A) Providing an aqueous slurry containing 5 to 100 parts by weight, dry basis, of hydrated silica pigment precipitate which has a bound alkali content in the range of 0.1 to 10% by weight as $Na_2O$, which has been prepared by precipitation from an aqueous solution of alkalimetal silicate with the aid of carbon dioxide; and which has continuously been maintained in an aqueous phase without having been dried after its precipitation;

(B) Providing a quantity of from 0.1 to 20% by weight, based on the silica pigment referred to in step (D), of oleophilic quaternary ammonium material, e.g. from the class consisting of the quaternary ammonium compounds having at least one quaternary ammonium group which has attached thereto a chain of at least 8 carbon atoms imparting oleophilic properties to the compound;

(C) Providing when used in step (D) reactant material selected from the class consisting of the members of the following groups: Group (I) the water soluble salts of aluminum or zinc; Group (II) the water soluble salts of the alkaline earth metals; Group (III) the water soluble acids; and Group (IV) combinations of two or more members selected from Groups (I), (II) and (III);

(D) Combining the wet silica pigment provided by step (A) with reactant material provided in step (C) in an amount in the range of from 0 to at least about a stoichiometric equivalent of the alkalinity of the said pigment, and with the oleophilic quaternary ammonium material provided by step (B), thereby providing a wet silica pigment for use in step (F);

(E) Providing an organic solvent dispersion of the elastomer containing (1) 100 parts of the elastomer by weight, and (2) the solvent of which is essentially water immiscible;

(F) Intimately mixing the solvent dispersion of elastomer provided by step (E) with (1) the wet silica pigment prepared by step (D), (2) from 0 to 75 parts by weight of carbon black—from (M)—with the limitation that the total of silica pigment and carbon black, dry basis, not exceed 80 parts by weight and (3) from 0 to 45 parts by weight of processing oil—from (M)—and (G) to (K) Removing the solvent and aqueous phase and recovering the resulting combination as a masterbatch, whereby there is formed a masterbatch containing essentially all of the silica pigment employed in step (D).

The elastomer (E) is dissolved in solvent (S')—which may be recycled solvent (S)—and said solvent itself, or as an azeotrope with water, preferably has a boiling point lower than that of water at atmospheric pressure, and the viscosity of the elastomer-solvent dispersion (i.e. solution) preferably should be selected in the range of 5,000 to 50,000 centipoises to facilitate the intimate mixing of the elastomer-solvent solution and the slurry of silica pigment treated with quaternary ammonium material.

The removal of the solvent (S') and recovery of masterbatch (K) as shown is effected by separating the volatiles from the coagulum, preferably in two steps (G) and (I), when the solvent or its aqueous azeotrope can be volatilized in step (G) prior to separation of the solids from the remaining aqueous phase in step (I). The volatilizing of the solvent, step (G) to convert the mixture (F) to coagulum and aqueous serum may be effected by running the dispersion (F) into hot water. The greater part of the separation of the coagulum from the aqueous serum in step (I) is preferably effected by mechanical dewatering, e.g. filtration, decanting, centrifuging, etc., to reduce the heat requirement for final drying of the masterbatch. The serum removed by mechanical dewatering is found to be essentially free of silica pigment as indicated at (J) in the drawing and the dry elastomer-silica pigment masterbatch thus incorporates essentially all of the silica pigment employed. The process thus curbs silica losses and assures a uniform silica pigment content in the masterbatch.

In preferred embodiments of the invention, the reactant employed in step (D) may be chosen predominantly from Group (I) or Group (III) and the serum produced is then acidic or alkaline, respectively, and corresponding compounds are contained in the masterbatch; and in further preferred embodiments, the blend (F), and the masterbatch (L) produced therefrom, contains at least 2 parts of carbon black per 3 parts of silica pigment, dry basis by weight.

The term "water soluble acids" as used herein designates the inorganic and organic acids which are water soluble both as free acids and in the form of alkali metal or ammonium salts. Examples of such acids are hydrochloric, sulfuric, nitric, phosphoric, formic, acetic, hydroxyacetic, the chloroacetic acids, propionic, oxalic, tartaric, citric, maleic, and the like.

Carbon black

By the term "carbon black" as used herein is meant any carbon blacks suitable for use by the rubber industry and set forth under the title "carbon blacks" at pp. 251–264 of the publication entitled "Materials and Compounding Ingredients for Rubber," compiled by J. V. Del Gatto, published by Rubber World, 1968, and herein incorporated by reference, e.g. Philblack O (TM), Statex K (TM), Statex 160 (TM), Kosmobile 77 (TM), Thermax (TM), and the like.

Processing oils

The term "processing oils" as used herein is meant rubber processing material of both liquid and solid types (if required the solids types can be converted to the liquid state for use herein with the aid of solvent or plasticizer) and include the processing materials set forth under "Plasticers and Softeners" at pp. 149–214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches, e.g. Bardol (TM), Bardol B (TM); (b) the asphalts, e.g. BRH #2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex-20, -419, -726, -757, -787 (TM), and Califlux TT (TM) and other oils suitable for rubber compounding or the oil extension of synthetic rubber; (d) the coumarine-indene oils and resins, e.g. Cumar Resin RH, -P10, -T (TM); (e) the liquid ester type plasticizers, e.g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g. Durez 12687, 12707 (TM) and the like; (g) the hydrocarbon resins, e.g. Neville-LX 782, -LX 125 (TM), Para-Flux, Para Resin 2457 (TM); (h) the hydrocarbon resin-coumarone indene polymers, e.g. Picco Resins (TM); (i) the pine tars and pine tar oils, rosin and rosin oils, and tall oil and its derivatives, e.g. PT–101, PT–401, PT–800 (TM); and the like.

DESCRIPTION OF PREFERRED EMBODIMENTS

Preferred embodiments illustrative, but not restrictive, of the invention are set forth in Examples 1 through 17. In these examples the hydrated silica pigment precipitate has a bound alkali content in the range of 0.1 to 10% by weight as $Na_2O$ and has been prepared by precipitation from an aqueous solution of alkali metal silicate with the aid of carbon dioxide and said silica precipitate has been continuously maintained in the aqueous phase without having been dried after its precipitation, and the aqueous silica pigment is mixed with oleophilic quaternary ammonium materials and from 0 to at least a stoichiometric equivalent, based on the alkalinity of the silica pigment slurry, of reagent selected from the class consisting of the members of Group (I) the water soluble salts of aluminum or zinc, Group (II) the mineral acids and water soluble organic acids (e.g. acetic or hydroxyacetic acid) and Group (III) combinations of any two or more of such members.

In these examples the reactants employed were: in Examples 1, 5, 8, aluminum sulfate; in Example 2, zinc sulfate; in Examples 3, 6, 7, 10, 11, 13–17, sulfuric acid; in Example 12, aluminum sulfate and sulfuric acid; and in Example 4, no reactant, and in all of the examples except Example 4 approximately a stoichiometric quantity of reactant was employed changing the alkaline pH 8.5 value to neutral pH 7.0 or even lower acidic pH values.

In these examples, the combination of elastomer-solvent dispersion with the so treated silica pigment was prepared by intimate mixing in the high speed, high shear Waring Blendor. The removal of solvent from the intimate mixture of the treated aqueous silica and the rubber-cement was accomplished by dropping the said mixture into boiling water and the volatile solvent readily boiled off leaving a wet coagulum or wet crumb in the aqueous serum, which serum was free of silica or essentially free of silica.

The elastomers employed in solution in the present invention include, but are not limited to, those prepared in anhydrous solvent systems, e.g. with the aid of catalyst systems employing metal alkyls and/or transition metal halides. In certain of these systems after the polymerization of the olefin and/or diolefin is complete and the catalyst has been removed, the elastomer is already in solvent solution or can readily be transferred to a solvent solution suitable for masterbatching as practiced in this invention.

In selecting the solvent the more highly voltatile hydrocarbon or halohydrocarbon, or halocarbon solvents are desirable, e.g.: butane, pentane, hexane, cyclohexane, methylene chloride, carbon tetrachloride, and the like.

The invention may be employed to improve wet silica-polymer solution masterbatching and masterbatches, using any alkaline slurry of never dried wet silica pigment containing bound alkali with oleophilic quarternary ammonium material in accordance with this invention, and is applicable to the formation of masterbatches therewith with elastomer-organic solvent dispersion, i.e. cements, of all solvent soluble elastomers, including not only hydrocarbon rubbers but also elastomers which are interpolymers, i.e. graft polymers, copolymers or block polymers, of monomers having at least one ethylenically unsaturated bond and polymerizable therethrough. The solvent cements, dispersions, or solutions employable herein thus include, but are not limited to, the diene homopolymer rubbers such as polybutadiene, polyisoprene, polychloroprene; those of diene copolymer rubbers such as the copolymers of diene monomers and monomers containing and copolymerizable therewith through a single ethylenically unsaturated group, e. g. butadiene-styrene, butadiene-acrylonitrile or methacrylonitrile, butadiene-acrylate or methacrylate ester; and rubbery copolymers of hydrocarbon monomers with polar vinylidene (including vinyl) monomers interpolymerizable therewith; elastomers from olefins and/or cyclic olefins and/or cyclic diolefins and/or dicyclic diolefins including the ethylene-propylene copolymers, the ethylene-propylene terpolymers, the ethylene-butylene copolymers and terpolymers, the butadiene-monoolefin interpolymers, the isobutylene-isoprene copolymers, and the like, elastomers from olefin oxides, poly-aromatic ethers and poly-alkyl ethers and other elastomers containing oxygen in the molecule, the fluorohydrocarbon and fluorocarbon elastomers, as well as mixtures and combinations thereof with processing oils, herein referred to as oil-rubber-silica masterbatches, and any of the foregoing further including other cooperating ingredients, such as carbon black, providing the silica pigment comprises an essential component thereof e.g. carbon black-elastomer-silica masterbatch.

Silica pigments containing residual alkali suitable for masterbatcheing in accordance with the present invention are usually precipitated by the gradual acidulation of aqueous sodium silicate solution.

The oleophilic quaternary ammonium materials suitable to aid the masterbatching of silica in accordance with the present invention may be prepared by reacting quaternizing agents such as alkyl halides, e.g. methyl chloride, methyl bromide, aralkyl halides, e.g. benzyl chloride, alkyl sulfonates or alkyl phosphates, e.g. dimethyl sulfate, or the like, with amine compounds having at least one tertiary amine group and having at least one hydrocarbon substitutent which contains 8 to 36 carbon atoms and which may comprise groups of straight chain, branched chain, cyclic and/or aryl configuration. Included among such quaternary ammonium compounds, but not limiting thereof are the following categories:

(1) The quaternary ammonium compounds derived from tertiary monoamines such as those represented by the formulas:

| Amine tertiary | Quaternizing agent | Quaternary ammonium compound |
|---|---|---|
| $\begin{matrix} R \\ R'-N \\ R'' \end{matrix}$ | $CH_3Cl$ methyl chloride | $\left[\begin{matrix} R \\ R'-N-CH_3 \\ R'' \end{matrix}\right]^+ Cl^-$ |
| $\begin{matrix} R \\ R'-N \\ R'' \end{matrix}$ | $C_6H_5CH_2Cl$ benzyl chloride | $\left[\begin{matrix} R \\ R'-N-CH_2C_6H_5 \\ R'' \end{matrix}\right]^+ Cl^-$ |
| $\begin{matrix} CH_2-CH_2 \\ O \quad\quad N-R \\ CH_2CH_2 \end{matrix}$ | $CH_3Cl$ | $\left[\begin{matrix} CH_2CH_2 \quad R \\ O \quad\quad N \\ CH_2CH_2 \quad CH_3 \end{matrix}\right]^+ Cl^-$ | in which R contains 8 to 36 carbon atoms, R' contains 1 to 36 carbon atoms and R" contains 1 to 36 carbon atoms. This category includes but is not limited to the so quaternized products of trioctyl amine, tridodecyl amine, tristearyl amine, octyldimethyl amine, dioctyl methyl amine, dodecyl dimethyl amine, didodecyl methyl amine, octadecyl dimethyl amine, dioctadecyl methyl amine, the mixed tertiary amines derived from fatty oils, coco dimethyl amine, dicoco methyl amine, soybean dimethyl amine, disoybean methyl amine, tallow dimethyl amine, ditallow methyl amine, and the hydrogenated or partially hydrogenated products of unsaturated tertiary amines, and the like; and the quaternization products of the long chain cyclic tertiary amines including but not limited to N-coco morpholine, N-soya morpholine, N-tallow morpholine and the like, some of which are commercially available under the trademark designations "Arquad."

(2) The quaternary ammonium compounds derived from diamines and represented by the formulas:

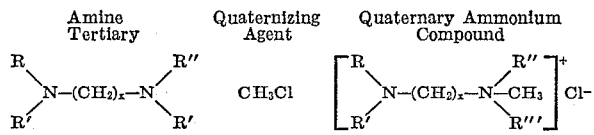

in which R contains 8 to 36 carbon atoms, R', R'', R''' contain each 1 to 36 carbon atoms and $x$ is an integer from 1 to 18, e.g. Redicote E-11, a trademarked product (reported to have the formula identified in Table VIII).

(3) The quaternary ammonium compounds derived from long-chain polyethoxylated and polypropoxylated amines and represented by the formulas:

| Tertiary amine | Quaternizing agent | Quaternary compound |
|---|---|---|
| $\begin{array}{l}R\\ \phantom{R}\diagdown\\ \phantom{RR}N\text{—}(CH_2CH_2O)_{x_1}H\\ \phantom{R}\diagup\\ R'\end{array}$ | CH$_3$Cl | $\left[\begin{array}{l}R\\ \phantom{R}\diagdown\\ \phantom{RR}N(CH_2CH_2O)_{x_1}H\\ \phantom{R}\diagup\phantom{R}|\\ R'\phantom{R}CH_3\end{array}\right]^+$ Cl$^-$ |
| $\begin{array}{l}R\\ \phantom{R}\diagdown\\ \phantom{RR}N\text{—}(CH_2CH_2CH_2O)_{x_2}H\\ \phantom{R}\diagup\\ R'\end{array}$ | CH$_3$Cl | $\left[\begin{array}{l}R\\ \phantom{R}\diagdown\\ \phantom{RR}N(CH_2CH_2CH_2O)_{x_2}H\\ \phantom{R}\diagup\phantom{R}|\\ R'\phantom{R}CH_3\end{array}\right]^+$ Cl$^-$ |
| $\begin{array}{l}\phantom{R-N}(CH_2CH_2O)_{x_3}H\\ \phantom{R-N}\diagup\\ R\text{—}N\\ \phantom{R-N}\diagdown\\ \phantom{R-N}(CH_2CH_2O)_{y_1}H\end{array}$ | CH$_3$Cl | $\left[\begin{array}{l}\phantom{R-N}(CH_2CH_2O)_{x_3}H\\ \phantom{R-N}\diagup\\ R\text{—}N\\ \phantom{R-N}\diagdown\\ CH_3\phantom{R}(CH_2CH_2O)_{y_1}H\end{array}\right]^+$ Cl$^-$ |
| $\begin{array}{l}\phantom{R-N}(CH_2CH_2CH_2O)_{x_4}H\\ \phantom{R-N}\diagup\\ R\text{—}N\\ \phantom{R-N}\diagdown\\ \phantom{R-N}(CH_2CH_2CH_2O)_{y_2}H\end{array}$ | CH$_3$Cl | $\left[\begin{array}{l}\phantom{R-N}(CH_2CH_2CH_2O)_{x_4}\\ \phantom{R-N}\diagup\\ R\text{—}N\\ \phantom{R-N}\diagdown\\ CH_3\phantom{R}(CH_2CH_2CH_2O)_{y_2}H\end{array}\right]^+$ Cl$^-$ | in which R contains 8 to 36 carbon atoms and R' contains 1 to 36 carbon atoms and $x_1$, $x_2$, $x_3$, $x_4$, $y_1$, $y_2$ are each integers from 1 to 30. This category includes but is not limited to coco amine, soybean amine, tallow amine and stearyl amine each reacted with a plurality e.g. 2, 5, 10 or 15, moles of ethylene oxide or propylene oxide per mole of amine and quaternized, and the like; e.g. those commercially available under the trademark "Ethoquad."

(4) The quaternary ammonium compounds derived from long-chain polyethoxylated and polypropoxylated diamines and represented by the formula $$\begin{array}{l}\phantom{R-N-C_3H_6N}(CH_2CH_2O)_xH\\ \phantom{R-N-C_3H_6N}\diagup\\ R\text{—}N\text{—}C_3H_6N\\ \phantom{R-N}|\phantom{-C_3H_6N}\diagdown\\ (CH_2CH_2O)_zH\phantom{R}(CH_2CH_2O)_yH\end{array}$$ (Amine Tertiary)

$+$
$2CH_3Cl$ (Quaternizing Agent)

$$\left[\begin{array}{l}\phantom{R-}CH_3\phantom{R}CH_3\phantom{R}(CH_2CH_2O)_xH\\ \phantom{R-}|\phantom{RRR}|\phantom{RRR}\diagup\\ R\text{—}N\text{—}\phantom{R}C_3H_6N\\ \phantom{R-}|\phantom{RRRRRRR}\diagdown\\ \phantom{R-}(CH_2CH_2O)_zH\phantom{R}(CH_2CH_2O)_yH\end{array}\right]^{++}$$ 2Cl$^-$ (Quaternary Ammonium Compound)

in which R contains 8 to 36 carbon atoms and $x$, $y$ and $z$ are integers from 1 to 30.

This category includes, but is not limited to, the quaternized products of N-coco trimethylene diamine, N-soya trimethylene diamine and N-tallow trimethylene diamine each with a plurality, e.g. 3, 10 or 20 moles of ethylene oxide or propylene oxide per mole of amine, and the like.

(5) Other types of quaternary ammonium compounds in which R contains from 8 to 36 carbon atoms include the following:

(a) $\left[\begin{array}{l}R\text{—}CONH(CH_2)_3N(CH_3)_2\\ \phantom{RRRRRRR}|\\ \phantom{RRRRRRR}C_2H_4OH\end{array}\right]^+$ Cl$^-$ as for example, when R=$C_{17}H_{35}$, Aerosol SE, a trademarked product, (b) 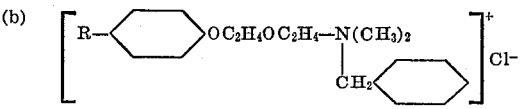

as for example, when R=$C_8H_{17}$, Hyamine 1622, a trademark product.

(c) 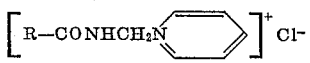

as for example, when R=$C_{17}H_{35}$, Zelan, a trademark product, and other compounds prepared by reacting fatty acid amides with formaldehyde (e.g. paraformaldehyde) with a tertiary base such as pyridine, alkylpyridine or quinoline.

(d) [R—COOC$_2$H$_4$NHCOCH$_2$N(CH$_3$)$_3$]$^+$Cl$^-$ as for example, when R=$C_{11}H_{23}$, Emulsept, a trademark product.

(e) 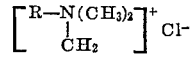

as for example, when R=$C_{18}H_{37}$, Triton K-60, a trademark product.

It is to be understood that the oleophilic quaternary ammonium compounds include the quaternary ammonium amine materials but do not include the materials containing only primary, secondary and/or tertiary amine groups or their acid salts, as the combinations of such amine materials with silica pigments and masterbatches thereof are included in a copending U.S. patent application filed concurrently herewith.

The oleophilic quaternary ammonium materials are for the most part only slightly water soluble compounds and are applied to the aqueous silica slurry in an easily removable solvent for the material, such as isopropanol. In certain instances the quaternary ammonium material may be combined with the aqueous silica slurry without the aid of solvent by mechanical working, as in a high shear mixer, and when polyalkylated the compound may be water soluble.

EXAMPLES

The following examples will serve to illustrate the invention in more detail:

Silica preparation and Examples 1–17

The aqueous slurry of never dried alkaline silica pigment employed in all the examples was prepared in a manner similar to Example 9 of U.S. Pat. No. 3,250,594 except that the ratio of 41° Bé commercial sodium silicate ($Na_2O/(SiO_2)_{3.22}$) to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2% and the filter cake had a solids of approximately 10% by weight. The resulting aqueous silica slurry was designated wet alkaline silica pigment-I, and had a bound and residual alkali content of about 1.5% by weight as $Na_2O$, and a serum pH of about 8.5.

A portion of this alkaline silica slurry was acidified to a pH of 4.5 with dilute sulfuric acid and as a filter cake, with washing to a pH of about 7, had a solids of approximately 10% by weight. The resulting aqueous silica slurry was designated wet silica pigment-II.

The just described filter cakes having a solids content of about 10% by weight were embraced within the term "wet silica pigment" (which herein connotes aqueously wet silica pigment) as are wet pigments of more reduced water content which can be prepared by pressing the said filter cakes, or of augmented water content, e.g. slurries having less than 10% solids content, and the terms "aqueously wet silica pigment" or "aqueously wet state," as employed herein are generic to all such conditions. Thus these terms as employed herein embrace aqueously wet silica pigment materials having a solids content in the range of about 1% to about 65% solids, dry basis, by weight; however, for economy in the practice of the invention wet silica pigments of reduced water content (solids content 8 to 36%) are preferred.

To determine pigment quality a portion of wet silica pigment-II was dried at 105° C., micropulverized and compounded as set forth in Table I hereof.

TABLE I

| Compound ingredients: | Quantities (pts. wt.) |
|---|---|
| Butadiene-styrene copolymer [1] | 100 |
| Silica pigment-II dried | 60 |
| Antioxidant, 2,2′-methylene-bis-(4-methyl-6-t.-butylphenol | 2.0 |
| Magnesium oxide | 4.0 |
| Paracoumarone-indene resin [2] | 10.1 |
| Zinc oxide | 1.0 |
| N-tert-butyl-2-benzothiazole-sulphenamide | 0.75 |
| N,N′-di-o-tolylguanidine | 1.5 |
| Triethanolamine | 1.0 |
| Phthalic anhydride | 0.75 |
| Sulfur | 2.25 |

[1] SBR 1502.
[2] Cumar Resin RH, a trademark product of Allied Chemical Corp.

The compound was aged overnight, re-milled and cured for 45 minutes at 287° F.

The physical test data for the vulcanizate so prepared with the foregoing silica pigment is set forth in Table II hereof.

TABLE II

| Silica tested (in vulcanizate): | Silica pigment-II |
|---|---|
| Hardness (Shore A) | 72 |
| Tensile (p.s.i.) | 3530 |
| Modulus (300%) | 1140 |
| Elong. (percent) | 575 |

In Examples 1–3 and 5–17 the alkaline silica slurry is mixed with sufficient water soluble aluminum salts, zinc salts and/or acid to react with substantially all of the bound and free alkali and thus reduce the aqueous silica slurry pH to 7.0 or lower. In these examples the alkaline, neutral, or acidic aqueous silica slurry is treated with the oleophilic quaternary ammonium compound in amounts in the range of 0.1 to 20% by weight based on the silica pigment or, for certain additional effects, in the range of 2 to 20% of the said material based on the silica pigment. In that the silica pigment has never been dried after being precipitated, it readily complexes with the quaternary ammonium compound and thickens. It is preferable to employ a silica filter cake, with or without fluidizing by high shear working, for treatment with the quaternary ammonium material. This minimizes the water to be homogenized into the elastomer-solvent cement. Combining of the thusly treated silica slurry and the elastomer-cement is carried out in a high speed, high shear mixer. The solvent is readily removed by injecting the homogenized mix into hot or boiling water. To facilitate recovery, solvents are employed which are immiscible with water and which themselves, or as aqueous azeotropes, boil lower than water at atmospheric pressure or at higher or lower pressures if it is desirable to employ them.

The solvents employed in the examples are typical of the $C_4$ to $C_8$ hydrocarbon solvents, e.g. hexane, benzene and toluene, and of the $C_1$ to $C_4$ halocarbon and halohydrocarbon solvents, e.g. methylenechloride, and other members of such groups and mixtures thereof may be selected which are suitable for dissolving the elastomers concerned, e.g. butane, pentane, cyclohexane, heptane, octane, xylene, carbon tetrachloride, trichloroethylene, and oxygenated solvents immiscible with water.

The processes of the examples are adaptable for either continuous or batch production of the masterbatch. In those instances in which an oil-rubber-silica pigment masterbatch is desired, up to about 45% of oil based on the elastomer is added to the elastomer-solvent cement, preferably with a small amount of ammonium hydroxide to aid dispersion of the oil and the elastomer cement and it will thus be understood that the masterbatch and elastomer dispersion contemplated by the invention may contain a minor proportion of oil. Similarly in Examples 1, 5, 8, 9, 12 etc., any soluble aluminum salt may be substituted for the hydrated aluminum sulfate, e.g. aluminum ammonium sulfate or aluminum sodium sulfate, and the coagulant solution contemplated by the invention may thus comprise minor amounts of ammonium and/or alkali metal salts without detriment to the process. Furthermore the elastomer cement and/or the aqueous dispersion of silica pigment and/or the aqueous reactant solution may contain a small proportion of ammonium hydroxide which appears in certain instances to facilitate practice of the invention. When carbon black is also to be included in the elastomer-silica pigment masterbatch, it may be incorporated as an aqueous slurry along with the slurry of the silica pigment.

In the following tabulations of Examples 1–26 the ingredients (A), (B), (C) etc. are listed in the order of their addition except where otherwise specifically set forth. The masterbatches are conveniently prepared at room temperatures, however, elevated temperatures may be employed as to accelerate the masterbatch formation.

TABLE III

Solution Polymer-Treated Silica Masterbatch (Parts by weight)

| Example | 1 | 2 | 3 | 4 |
|---|---|---|---|---|
| (A) Silica pigment slurry-treated quaternary ammonium material: | | | | |
| (a) Silica pigment slurry: | | | | |
| Alkaline silica pigment-I (pH= 8.5–9.5) | 150 | 150 | 150 | 150 |
| Dry solids basis | 15 | 15 | 15 | 15 |
| Water | 50 | 50 | 50 | 50 |
| (b) Reactant aqueous solution: | | | | |
| 2% aluminum sulfate [1] | 55 | | | |
| 2% zinc sulfate | | 45 | | |
| 2% sulfuric acid | | | 25.5 | |
| Silica slurry pH | 5.0 | 6.5 | 7.0 | 8.5 |
| (c) Treated silica pigment: Filtered (X) | X | X | X | X |
| (d) Oleophilic-quaternary ammonium material: | | | | |
| 10% Hyamine 1622 [2] | 3.0 | 3.0 | | |
| 10% Arquad S [3] | | | 3.0 | 3.0 |
| (e) Combine (a) and (b) filter then add (d): Blend, (X) | X | X | X | X |

TABLE III—Continued

| Example | 1 | 2 | 3 | 4 |
|---|---|---|---|---|
| (B) Polymer solution: | | | | |
| (a) Polymer: | | | | |
| Isobutylene-isoprene [4] | 30 | | | |
| Butadiene-styrene [5] | | 30 | | |
| Ethylene-propylene terpolymer [6] | | | 30 | 30 |
| (b) Solvent: | | | | |
| Hexane | 132 | 270 | 270 | 270 |
| Antioxidant [7] | 0.6 | 0.6 | 0.6 | 0.6 |
| (c) Solvation conditions: | | | | |
| Temperature, °C | 60 | 60 | 60 | 60 |
| Time agitated, hrs | 12 | 12 | 12 | 12 |
| (C) Blending (A) plus (B): Blender,[8] min | 0.5 | 0.5 | 0.5 | 0.5 |
| (D) Solvent removal:[9] | | | | |
| Boiling water (X) | X | X | X | X |
| Silica separation into water phase | None | None | None | None |
| (E) Masterbatch: Dried (105° C.) (X) | X | X | X | X |

[1] Aluminum sulfate=$Al_2(SO_4)_3 \cdot 14H_2O$.
[2] Hyamine 1622 (a trademark product) diisobutyl phenoxyethoxyethyl dimethyl benzyl ammonium chloride monohydrate, in isopropanol.
[3] Arquad S (a trademark product) soya trimethyl ammonium chloride in isopropanol.
[4] Butyl rubber, a trademark product.
[5] Solprene 300, (a trademark product) a normal viscosity, non-staining, solution polymerized random 75/25 copolymer of butadiene and styrene.
[6] Nordel 1320, (a trademark product) a terpolymer of ethylene, propylene and a non-conjugated diene.
[7] The antioxidant is 2,2-methylene-bis (4-methyl-6-t.-butylphenol).
[8] Waring Blendor, a trademark product.
[9] The silica-solvated polymer masterbatch is dropped into boiling water to vaporize the solvent and the polymer-silica blend is separated from the serum and dried to yield the masterbatch.

TABLE IV

Solution Polymer-Treated Silica Masterbatch (Parts by weight)

| Example | 5 | 6 | 7 | 8 | 9 |
|---|---|---|---|---|---|
| (A) Silica pigment slurry-treated oleophilic quaternary ammonium compound: | | | | | |
| (a) Silica pigment slurry: | | | | | |
| Alkaline silica pigment-I (pH=8.5-9.5) | 150 | 150 | 150 | 150 | 150 |
| Dry solids basis | 15 | 15 | 15 | 15 | 15 |
| Water | 50 | 50 | 50 | 50 | 50 |
| (b) Reactant-aqueous solution: | | | | | |
| 2% aluminum sulfate [1] | 55 | | | 28 | 55 |
| 2% sulfuric acid | | 25.5 | 25.5 | 13 | |
| Silica slurry, pH | 5.0 | 7.0 | 7.0 | 6.0 | 5.0 |
| (c) Oleophilic quaternary ammonium material: | | | | | |
| 10% Arquad C [2] | 3.0 | 3.0 | | | |
| 10% Arquad T [3] | | | 3.0 | 3.0 | 9.0 |
| (d) Treated silica pigment: | | | | | |
| Filtered (X) | X | X | X | X | X |
| (B) Polymer solution: | | | | | |
| (a) Copolymer: | | | | | |
| Butadiene-styrene [4]* | 30 | | | | |
| Butadiene-styrene [5]* | | 30 | | | |
| Isobutylene-isoprene [6] | | | 30 | 30 | 30 |
| (b) Solvent: | | | | | |
| Hexane | 270 | 120 | 132 | 132 | 132 |
| Antioxidant [7] | 0.6 | 0.6 | 0.6 | 0.6 | 0.6 |
| (c) Solvation conditions: | | | | | |
| Temp., °C | 70 | 70 | 70 | 70 | 70 |
| Time agitated, hrs | 12 | 12 | 12 | 12 | 12 |
| (C) Blending (A) plus (B): Blendor [8], min | 0.5 | 0.5 | 0.5 | 0.5 | 0.5 |
| (D) Solvent removal:[9] | | | | | |
| Boiling water (X) | X | X | X | X | X |
| Silica separation into water phase | None | None | None | None | None |
| (E) Masterbatch: Dried (105° C.) (X) | X | X | X | X | X |

[1] Aluminum sulfate $Al_2(SO_4)_3 \cdot 14H_2O$.
[2] Arquad C (a trademark product) coco trimethyl ammonium chloride in isopropanol.
[3] Arquad T (a trademark product) tallow trimethyl ammonium chloride in isopropanol.
[4] Solprene 300, (a trademark product) a normal viscosity, non-staining, solution polymerized random 75/25 copolymer of butadiene and styrene.
[5] Solprene 1206 (a trademark product) same as [1] except of low viscosity.
[6] Butyl rubber 268 (a trademark product).
[7] The antioxidant is 2,2'-methylene-bis (4-methyl-6-t.-butylphenol).
[8] Waring Blendor, a trademark product.
[9] The silica-solvated polymer masterbatch is dropped into boiling water to vaporize the solvent and the silica-polymer masterbatch is recovered and dried.
*Milled.

TABLE V

Solution Polymer-Treated Silica Masterbatch (Parts by weight)

| Example | 10 | 11 | 12 | 13 |
|---|---|---|---|---|
| (A) Silica pigment slurry-treated quaternary ammonium material: | | | | |
| (a) Silica pigment aqueous slurry: | | | | |
| Alkaline silica pigment-I (pH=8.5-9.6) | 150 | 150 | 150 | 150 |
| Dry solids basis | 15 | 15 | 15 | 15 |
| Water | 50 | 50 | 50 | 50 |
| (b) Reactant aqueous solution: | | | | |
| 2% calcium chloride | 35 | | | |
| 2% barium chloride | | 60 | | |
| 2% Magnesium sulfate | | | 35 | |
| 2% ammonium aluminum | | | | 85 |
| Silica slurry pH | 8.0 | 8.6 | 8.6 | 5.0 |
| (c) Treated silica pigment: | | | | |
| Filtered (X) | X | X | X | X |
| Filter cake | 121 | 120 | 120 | 119 |
| (d) Oleophilic-quaternary ammonium type material: | | | | |
| 10% Hyamine 1622 [1] | 9.0 | | | 9.0 |
| 10% Arquad S [2] | | 9.0 | | |
| 10% Arquad C [3] | | | 12.0 | |
| (e) Blending (c) and (d): Blendor [4], min | 0.2 | 0.2 | 0.2 | 0.2 |
| (B) Polymer solution: | | | | |
| (a) Polymer: Isobutylene-isoprene [5] | 30 | 30 | 30 | |
| (b) Solvent: | | | | |
| Hexane | 132 | 132 | 132 | 132 |
| Antioxidant [6] | 0.6 | 0.6 | 0.6 | 0.6 |
| (c) Solvation conditions: | | | | |
| Temperature, °C | 60 | 60 | 60 | 60 |
| Time agitated, hrs | 12 | 12 | 12 | 12 |
| (C) Blending (A) plus (B): Blendor [4], min | | | | |
| (D) Solvent removal: [7] | | | | |
| Boiling water (X) | X | X | X | X |
| Silica separation into water phase | None | None | None | None |
| (E) Masterbatch: Dried (105° C.) (X) | X | X | X | X |

[1] Hyamine 1622 (a trademark product) diisobutyl phenoxyethoxyethyl dimethyl benzyl ammonium chloride monohydrate, in isopropanol.
[2] Arquad S (a trademark product) soya trimethyl ammonium chloride in isopropanol.
[3] Arquad C (a trademark product) coco trimethyl ammonium chloride in isopropanol.
[4] Waring Blendor (a trademark product).
[5] Butyl rubber, a trademark product.
[6] The antioxidant is 2,2'-methylene-bis (4-methyl-6-t.-butylphenol).
[7] The silica-solvated polymer masterbatch is dropped into boiling water to vaporize the solvent and the polymer-silica masterbatch is recovered and dried.

TABLE VI

Solution Polymer-Treated Silica Masterbatch (Parts by weight)

| Example | 14 | 15 | 16 | 17 |
|---|---|---|---|---|
| (A) Silica pigment slurry-treated quaternary ammonium material: | | | | |
| (a) Silica pigment slurry: | | | | |
| Alkaline silica pigment (pH 8.5) | 150 | 150 | 150 | 150 |
| Dry solids basis | 15 | 15 | 15 | 15 |
| Water | 50 | 50 | 50 | 50 |
| (b) Reactant-aqueous solution: | | | | |
| 2% aluminum sulfate [1] | 55 | 55 | 55 | |
| 2% sulfuric acid | | | | 25.5 |
| Silica slurry pH | 5.0 | 5.0 | 5.0 | 7.0 |
| (c) Treated silica pigment: | | | | |
| Filtered (X) | X | X | X | X |
| Filter cake | 121 | 121 | 121 | 120 |
| (d) Oleophilic-quaternary ammonium compound: | | | | |
| 10% Arquad 12 [2] | 1.8 | | | |
| 10% Redicote E-11 [3] | | 1.8 | 1.8 | |
| Ethoquad 18/12 | | | | 1.8 |
| 28% aqueous ammonia | | | | 1.0 |
| (B) Polymer solution: | | | | |
| (a) Polymer: | | | | |
| Isobutylene-isoprene [5] | 30 | | | |
| Butadiene-styrene [6] | | 30 | 30 | |
| Ethylene-propylene terpolymer [7] | | | | 30 |
| (b) Solvent: | | | | |
| Hexane | 132 | 120 | 120 | 270 |
| Antioxidant [8] | 0.6 | 0.6 | 0.6 | 0.6 |
| (c) Solvation conditions: | | | | |
| Temp. °C | 60 | 60 | 60 | 60 |
| Time agitated, hrs | 12 | 12 | 12 | 12 |

TABLE VI—Continued

| Example | 14 | 15 | 16 | 17 |
|---|---|---|---|---|
| (C) Blending (A) plus (B): Blendor,⁹ min | 0.5 | 0.5 | 0.5 | 0.5 |
| (D) Solvent removal:¹⁰ | | | | |
| Boiling water (X) | X | X | X | X |
| Silica separation into water phase | None | None | None | None |
| (E) Masterbatch: Dried (105° C.) (X) | X | X | X | X |

[1] Aluminum sulfate $Al_2(SO_4)_3 \cdot 14H_2O$.
[2] Arquad 12 (a trademark product) dodecyl trimethyl ammonium chloride in isopropanol.
[3] Redicote E-11 in benzene (a trademark product) reported to be

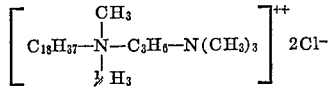

[4] Ethoquad 18/12 in benzene (a trademark product) of the structure

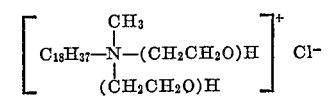

[5] Butyl rubber (a trademark product).
[6] Solprene 1206 (a trademark product) a low viscosity, non-staining, solution polymerized random 75/25 copolymer of butadiene and styrene.
[7] Nordel 1320 (a trademark product) a terpolymer of ethylene, propylene and a non-conjugated diene.
[8] The antioxidant is 2,2'-methylene-bis(4-methyl-6-t.-butylphenol).
[9] Waring Blendor, a trademark product.
[10] The silica-solvated polymer masterbatch is dropped into boiling water to vaporize the solvent and the polymer-silica masterbatch is recovered and dried.

EXAMPLES 18–26

Polymer-silica masterbatches may also be prepared containing processing oils and/or carbon black as previously described to obtain oil and/or carbon black containing elastomer-silica pigment masterbatches, without departing from the invention. In such practice, from 0 to 65 parts by weight of carbon black may be employed (with the limitation that the total quantity of silica pigment and carbon black, dry basis, not exceed 100 parts by weight, per 100 parts of the elastomers) and/or from 0 to 45 parts by weight of processing oil may be employed, by combining with the elastomer solvent cement and silica pigment slurry prior to the coagulation thereof by solvent removal. Such combinations may be effected in any suitable way, e.g. the carbon black may be added as an aqueous slurry and the processing oil as an aqueous dispersion preferably with an anionic emulsifying agent and/or ammonium hydroxide.

In preferred embodiments of this invention, the oleophilic quaternary ammonium treated silica pigment being in a slurry form, the carbon black and/or processing oil may be added directly to the said slurry without any prior aqueous dispersement, and with the aid of a high shear mixer, e.g. a Waring Blendor, a uniform dispersion of the combination is readily obtained.

The following Examples 18–27 are illustrative of such modes of practicing the invention.

TABLE VII
Including Processing Oil and/or Carbon Black (Parts by weight)

| Example | 18 | 19 | 20 | 21 |
|---|---|---|---|---|
| (A) Silica pigment slurry-quaternary ammonium material: | | | | |
| (a) Silica pigment slurry: | | | | |
| Alkaline silica pigment-I (pH=8.5–9.5) | 200 | 200 | 200 | 200 |
| Dry solids basis | 20 | 20 | 20 | 15 |
| Water | 50 | 30 | 50 | 50 |
| (b) Reactant-aqueous solution: | | | | |
| 10% sulfuric acid | 6.8 | 6.8 | 6.8 | 5.1 |
| Silica slurry, pH* | 6.5 | 6.5 | 6.5 | 6.5 |
| (c) Treated silica pigment: | | | | |
| Filtered (X) | X | X | X | X |
| Filter cake | 160 | 16 | 160 | 120 |
| (d) Oleophilic quaternary ammonium material: | | | | |
| 10% Arquad C ¹ | 2.4 | | | |
| 10% Arquad 2C ² | | 3.2 | | |
| 10% Arquad T ³ | | | 2.4 | 2.4 |
| (e) Processing oil etc.: | | | | |
| Processing oil ⁴ | 20 | 20 | | |
| Benzene | 40 | 40 | | 40 |
| 28% aqueous ammonia | 1.6 | | | |
| (f) Combine (d) and (e) then with (c)(X) | X | X | X | X |
| (B) Carbon black: | | | | |
| Carbon black ⁵ | 45 | 45 | | 40 |
| Water | 200 | 200 | | 176 |
| Blender, high shear (X) | X | X | | X |
| (C) Combine A and B and mix (X) | X | X | X | X |
| (D) Polymer solution: | | | | |
| (a) Copolymer: | | | | |
| Butadiene-styrene ⁶ | 35 | | | |
| Butadiene-styrene ⁷ | | 100 | | |
| Isobutylene-isoprene ⁸ | | | 100 | |
| Ethylene-propylene terpolymer ⁹ | | | | 100 |
| (b) Solvent: | | | | |
| Hexane | 200 | 400 | 440 | 900 |
| Antioxidant ⁹ | 0.75 | 2 | 2 | 2 |
| (c) Solvation conditions: | | | | |
| Temp., ° C. | 70 | 70 | 70 | 70 |
| Time agitated, hrs | 12 | 12 | 12 | 12 |
| (E) Blending (A) plus (B) plus (C): Blender ¹⁰, min | 0.5 | 0.5 | 0.5 | 0.5 |
| (F) Solvent removal: ¹¹ | | | | |
| Boiling water (X) | X | X | X | X |
| Silica separation into water phase | None | None | None | None |
| (G) Masterbatch: Dried (105° C.) (X) | X | X | X | X |

[1] Arquad C (a trademark product) coco trimethy ammonium chloride in isopropanol.
[2] Arquad 2C (a trademark product) dicoco dimethyl ammonium chloride in isopropanol.
[3] Arquad T (a trademark product) tallow trimethyl ammonium chloride in isopropanol.
[4] Sundex 2XH, a trademark product.
[5] Statex 160HR, a trademark product.
[6] Solprene 300, (a trademark product) a normal viscosity, non-staining, solution polymerized random 75/25 copolymer of butadiene and styrene.
[7] Solprene 1206 (a trademark product) same as (¹) except of low viscosity.
[8] Butyl rubber 268, a trademark product.
[9] Nordel 1320 (a trademark product), a terpolymer of ethyl ethylene-propylene and a non-conjugated diene.
[10] The antioxidant is 2,2'-methylene-bis(4-methyl-6-t.-butylphenol).
[11] Waring Blendor, a trademark product.
[12] The silica-solvated polymer masterbatch is dropped into boiling water to vaporize the solvent and the polymer-silica masterbatch is recovered and dried.
*Milled.

TABLE VIII
Solution Polymer-Treated Silica Masterbatch Including Carbon Black and Processing Oil (Parts by weight)

| Example | 22 | 23 | 24 | 25 | 26 |
|---|---|---|---|---|---|
| (A) Silica pigment slurry: | | | | | |
| Alkaline silica pigment-I pH=8.5–9.5 | 25 | 25 | 25 | 25 | 25 |
| Dry basis | 2.5 | 2.5 | 2.5 | 2.5 | 2.5 |
| Water | | | | | |
| (B) Reactant-aqueous solution: | | | | | |
| 2% aluminum sulfate ¹ | 8.5 | | | | |
| 2% calcium chloride | | 5.0 | | | |
| 2% zinc sulfate | | | 6.8 | | |
| 2% magnesium sulfate | | | | 5.0 | |
| 2% sulfuric acid | | | | | 4.5 |
| (C) Combine (A) and (B) and filter (X) | X | X | X | X | X |
| (D) Oleophilic quaternary ammonium material: | | | | | |
| 20% aqueous Hyamine 1622 ² | 1.0 | | | | |
| 20% Redicote E-11* ³ | | 0.5 | | | |
| 10% Arquad C* ⁴ | | | 0.5 | | |
| 10% Arquad T* ⁵ | | | | 0.5 | |
| 10% Arquad 18* ⁶ in isopropanol | | | | | 1.0 |
| (E) Carbon black and processing oil: | | | | | |
| Philblack O ⁷ | 5 | 5 | 5 | 5 | 5 |
| Sundex 2XH ⁷ | 1 | | | | |
| (F) Combine (C) and (D) then (E): Blendor, ⁸ min | 0.5 | 0.5 | 0.5 | 0.5 | 0.5 |
| (G) Polymer solution in hexane: | | | | | |
| 18.5% isobutylene-isoprene ⁸ | 81 | 81 | | | |
| 10% butadiene-styrene ⁹ | | | 150 | 150 | |
| 10% ethylene-propylene terpolymer ¹⁰ | | | | | 150 |
| Dry solids basis | 15 | 15 | 15 | 15 | 15 |
| Hexane | 66 | 66 | 135 | 135 | 135 |
| Antioxidant ¹¹ | 0.3 | 0.3 | 0.3 | 0.3 | 0.3 |
| (H) Combine (F) and (G): Blendor ⁸, min | 0.5 | 0.5 | 0.5 | 0.5 | 0.5 |

TABLE VIII—Continued

| Example | 22 | 23 | 24 | 25 | 26 |
|---|---|---|---|---|---|
| (I) Solvent removal:[12] | | | | | |
| Boiling water (X) | X | X | X | X | X |
| Silica and/or black separation into water phase | None | None | None | None | None |
| (J) Masterbatch: Dried (105° C.) (X) | X | X | X | X | X |

[1] Aluminum sulfate $Al_2(SO_4)_3 \cdot 14H_2O$.
[2] A trademark product, diisobutyl phenoxyethoxyethyl dimethyl benzyl ammonium chloride.
[3] See Table V footnote 3.
[4] Coco trimethyl ammonium chloride.
[5] Tallow trimethyl ammonium chloride.
[6] Octadecyl trimethyl ammonium chloride.
[7] A trademark product.
[8] Waring Blendor, a trademark product.
[9] Butyl rubber 268, a trademark product.
[10] Solprene 300, a trademark product, a normal viscosity, non-staining, solution polymerized random 75/25 copolymer of butadiene and styrene.
[11] Nardel 1320, a trademark product, a terpolymer of ethylene, propylene and a non-conjugated diene.
[12] Antioxidant 2,2'-methylene-bis(4-methylene-6-t.-butylphenol).
[13] The silica-black-solvated polymer masterbatch is dropped into boiling water to vaporize the solvent and the polymer-silica masterbatch is recovered and dried.

EXAMPLE 27

The precursor silica pigment for this example was prepared in a concrete reactor according to my copending application Ser. No. 458,483 filed May 24, 1965, using low shear agitation according to my U.S. application Ser. No. 418,131 filed May 24, 1965, and employing a submerged combustion burner in accordance with my U.S. application U.S. Ser. No. 458,132 filed May 24, 1965, and further utilizing the rate change procedure in accordance with U.S. Pat. No. 3,250,594.

Charged to the reactor were 405 lbs. of 41° Bé. aqueous sodium silicate containing alkalinity 8.9% as $Na_2O$ and 27.7% $SiO_2$, and also charged were 1800 lbs. of water, and the temperature was raised to 70° C. and maintained at that value. Carbon dioxide as acidulating agent was introduced at a constant rate for 220 minutes, at which time the Tyndall effect appeared, and the constant rate was then doubled, and after 555 minutes the acidulation achieved was 102% of that theoretically necessary to convert the alkalinity to $Na_2CO_3$, and thereafter over a period of four hours addition of carbon dioxide was continued, raising the achieved acidulation to approximately 120% of theoretical, conditions of low shear agitation being maintained throughout.

The resulting silica pigment slurry was filtered and washed, yielding a filter cake containing 11% solids, dry basis. A sample of this filter cake slurried with an equal weight of water was filtered and the filtrate had a resistivity of 1250 ohm-centimeters. A 1440 gram portion of this washed and untreated cake was employed in this example.

In the Waring Blendor, the 1440 gram portion of the untreated filter cake was mechanically fractured at high speed setting for 10 minutes and 58 ml. of 10% sulfuric acid was then added, resulting in a serum pH of 4.0. Then (10) grams of the cationic emulsifier octadecyltrimethylammonium chloride (50% active) was mixed with the silica slurry and 370 grams dry basis of butyl rubber solution.

The butyl rubber solution was prepared by dissolving 370 grams of sheeted out butyl rubber (Thiokol Type 165) and 6500 grams of methylene chloride and 5 grams of antioxidant [2,2'-methylene-bis(4-methyl-6-t.-butylphenol)] and homogenizing the same for 3 minutes in the Waring Blendor at high speed setting. To recover the masterbatch the wet silica pigment slurry rubber-solvent blend was run into 3 liters boiling water which flashed off the methylene chloride for recovery, and the resulting wet masterbatch separated as a coagulum and was removed and dried.

In the foregoing example the butyl rubber solution may be replaced by solutions of other elastomers in suitable solvents, especially hydrocarbon ealstomers prepared in solvents such as ethylene-propylene terpolymers, polyisoprene, polybutadiene, butadienestyrene copolymers, etc.

The masterbatches prepared in accordance with the present invention may be compounded with vulcanizing ingredients and vulcanized by any suitable receipe (e.g. the recipe set forth in Table I, above) to form useful vulcanizates.

From the foregoing disclosure, it will be appreciated, inter alia, that the present invention improves elastomer-silica pigment masterbatches by employing silica pigments combined with specific materials to improve the compatability of the said pigments with elastomer materials in general.

In certain co-pending applications filed concurrently herewith, different modes of improving elastomer-silica pigment masterbatches are provided by employing elastomers supplied with certain substituent groups improving the compatability of the elastomers with the aqueously wet silica pigments.

To maintain clear lines of division between the copending applications, the claims of this application recite, and rely for patentability on, only its own improvements, without prejudice to their applicability to processes or products employing such improvements along with a different improvement disclosed in one of said copending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

What is claimed is:

1. A process for the curbing of silica pigment losses and the promotion of uniformity of product in the preparation of a silica pigment-elastomer masterbatch from
   (a) aqueously wet hydrated silica pigment; and
   (b) an elastomer;
   which process comprises the steps of:
   (c) providing an organic solvent dispersion of the elastomer containing (1) 100 parts of an elastomer by weight, and (2) the solvent of which is essentially water immiscible,
   (d) providing an aqueous slurry containing 5 to 75 parts by weight, dry basis, of hydrated silica pigment precipitate which has a bound alkali content in the range of 0.1 to 10% by weight as $Na_2O$; which has been prepared by precipitation from an aqueous solution of alkali-metal silicate with the aid of carbon dioxide; which has been filtered and washed; and which has continuously been maintained in an aqueously wet state without having been dried after its precipitation;
   (e) providing a quantity of from 0.1 to 20% by weight, based on the silica pigment referred to in step (d), of oleophilic quaternary ammonium material;
   (f) combining the aqueous silica pigment slurry provided by step (d) with the oleophilic amine material provided by step (e), and from 0 to at least a stoichiometric equivalent, based on the alkalinity of the silica pigment slurry of reactant selected from the class consisting of the members of the following groups: Group (I) the water soluble salts of aluminum of zinc; Group (II) the water soluble salts of alkaline earth metals; Group (III) the water soluble acids; and Group (IV) combinations of any two or more of such members, thereby to produce a treated silica pigment slurry;

(g) then intimately mixing the solvent dispersion of elastomer provided by step (c), together with (1) the treated silica pigment slurry prepared by step (f), (2) from 0 to 75 parts by weight of carbon black with the limitation that the total of silica pigment and carbon black, dry basis, not exceed 80 parts by weight, and (3) from 0 to 45 parts by weight of processing oil, and (h) separating the volatiles from the resulting masterbatch.

2. A process as defined in claim 1, in which the solvent employed in step (c) itself or as an aqueous azeotrope has a boiling point lower than that of water at atmospheric pressure, and in which step (h) is effected by volatilizing solvent from the intimate mixture to convert said mixture to coagulum and aqueous serum, and then separating the coagulum from the serum as a masterbatch.

3. A process as claimed in claim 1, wherein the reactant is employed in step (f) in about said stoichiometric equivalent amount.

4. A process as claimed in claim 1, in which the elastomer consists essentially of polymer prepared by essentially anhydrous polymerization.

5. A process as claimed in claim 1, in which at least 5 parts by weight of carbon black are employed in step (g).

6. A process as claimed in claim 1, in which at least 5 parts by weight of processing oil are employed in step (g).

References Cited

UNITED STATES PATENTS

| | | | |
|---|---|---|---|
| 2,692,863 | 10/1954 | Iler | 252—309 |
| 2,821,232 | 1/1958 | Wolf | 152—330 |
| 3,014,810 | 12/1961 | Dybalski et al. | 106—308 |
| 3,081,276 | 3/1963 | Synder et al. | 260—33.6 |
| 3,172,726 | 3/1965 | Burke et al. | 23—182 |
| 3,244,660 | 4/1966 | Herold | 260—29.7 |
| 3,250,594 | 5/1966 | Burke et al. | 23—182 |

MORRIS LIEBMAN, Primary Examiner

J. H. DERRINGTON, Assistant Examiner

U.S. Cl. X.R.

106—308 N; 260—41.5 R, 41.5 A, 41.5 MP